(12) United States Patent
Sajassi et al.

(10) Patent No.: US 8,842,577 B2
(45) Date of Patent: Sep. 23, 2014

(54) ENABLING MEDIA ACCESS CONTROL ADDRESS MOBILITY IN AN ETHERNET VIRTUAL PRIVATE NETWORK

(75) Inventors: Ali Sajassi, San Ramon, CA (US); Samer Salam, Vancouver (CA); Keyur Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 95 days.

(21) Appl. No.: 13/471,724

(22) Filed: May 15, 2012

(65) Prior Publication Data

US 2013/0308646 A1 Nov. 21, 2013

(51) Int. Cl.
*H04L 12/28* (2006.01)

(52) U.S. Cl.
USPC ......... 370/255; 370/395.5; 370/400; 370/465

(58) Field of Classification Search
None
See application file for complete search history.

(56) References Cited

U.S. PATENT DOCUMENTS

| 7,633,889 | B2 | 12/2009 | Higashitaniguchi et al. |
| 8,559,335 | B2 * | 10/2013 | Berman ................ 370/254 |
| 8,565,230 | B2 | 10/2013 | Keesara et al. |
| 2009/0274155 | A1 | 11/2009 | Nakash |
| 2010/0220739 | A1 | 9/2010 | Ishiguro |
| 2013/0235876 | A1 * | 9/2013 | Sajassi et al. ............ 370/401 |

* cited by examiner

*Primary Examiner* — Donald Mills
(74) *Attorney, Agent, or Firm* — P. Su (57) ABSTRACT

In one embodiment, a method includes obtaining an indication that a device is attached to a provider edge. The device has a media access control (MAC) address, wherein the device was previously attached to a first provider edge (PE) of a Multiprotocol Label Switching (MPLS) network. The method also includes issuing a first advertisement that identifies the MAC address. The first advertisement includes a first MAC address mobility attribute arranged to indicate a number of times the MAC address has moved with respect to the MPLS network.

23 Claims, 11 Drawing Sheets

ENABLING MEDIA ACCESS CONTROL ADDRESS MOBILITY IN AN ETHERNET VIRTUAL PRIVATE NETWORK

TECHNICAL FIELD

The disclosure relates generally to network based services. More particularly, the disclosure relates to enabling provider edge nodes associated with a Border Gateway Protocol (BGP) to efficiently handle relatively short-lived moves by a virtual machine having a media access control (MAC) address.

BACKGROUND

Ethernet Virtual Private Network (E-VPN) is a layer 2 virtual private network (VPN) technology, and is based on Multiprotocol Label Switching (MPLS). E-VPN is often used as a data center interconnect (DCI) solution in large enterprises interconnecting enterprises and service providers that deploy virtual private cloud servies over MPLS-enabled network. In E-VPN, media access control (MAC) addresses are typically distributed over an MPLS core in a Border Gateway Protocol (BGP) control plane.

When a MAC address moves from behind one provider edge node associated with an MPLS core to behind another provider edge node associated with the MPLS core, specialized procedures, e.g., hand-shake procedures, are generally required in the control-plane to reflect MAC address mobility. In addition, specialized procedures may ensure that substantially all provider edge nodes associated with an MPLS core effectively share a common view of the latest reachability information associated with each MAC address. Hand-shake procedures may include a hand-shake mechanism in Intermediate System to Intermediate System (IS-IS). Such hand-shake procedures, however, are unable to process multiple moves for the same address during a relatively short timeframe, as for example a time frame that is less than a few seconds or a few sub-seconds.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes obtaining an indication that a device such as a host or an end-station is attached, as for example to a provider edge. The device has a media access control (MAC) address, wherein the device was previously attached to a first provider edge (PE) of a Multiprotocol Label Switching (MPLS) network. The method also includes issuing a first advertisement that identifies the MAC address. The first advertisement includes a first MAC address mobility attribute arranged to indicate a number of times the MAC address has moved with respect to the MPLS network.

Description

The ability to handle relatively short-lived moves of a virtual machine that has a media access control (MAC) address within an Ethernet virtual private network (E-VPN) or an Ethernet Provider Backbone Bridging E-VPN (PBB-EVPN) allows MAC address mobility to be supported with respect to a Border Gateway Protocol (BGP) in an efficient matter. Thus, virtual machine mobility may be readily supported with respect to relatively large enterprises interconnecting data centers and with respect to service providers that deploy virtual private cloud services.

When a mobile device with an associated MAC address moves from one provider edge (PE) associated with a Multiprotocol Label Switching (MPLS) network to another PE associated with the MPLS network in a relatively short amount of time, e.g., on an order of less than a few seconds or an order of less than a few subseconds, the use of an attribute included in a BGP MAC route advertisement allows the PEs to efficiently identify the PE to which the MAC address is currently attached. In other words, MAC mobility in an E-VPN associated with a MPLS network is supported by allowing the location of a MAC address with respect to the E-VPN to be readily tracked through the use of an attribute provided in BGP MAC route advertisements.

In one embodiment, a MAC address mobility attribute that is an extended community attribute may include a counter that is incremented by a source of a BGP MAC route advertisement. Such a counter may be incremented to provide an indication of how many times a MAC address associated with the BGP MAC route advertisement has moved. When two BGP MAC route advertisements have counters of the same value with respect to the same MAC address, the indication may be that a MAC address has moved within a relatively short amount of time, and a conflict may be recognized. Once a conflict is recognized, steps may be taken to identify where the MAC address currently resides, i.e., where the MAC address is currently located.

Figure 1A:
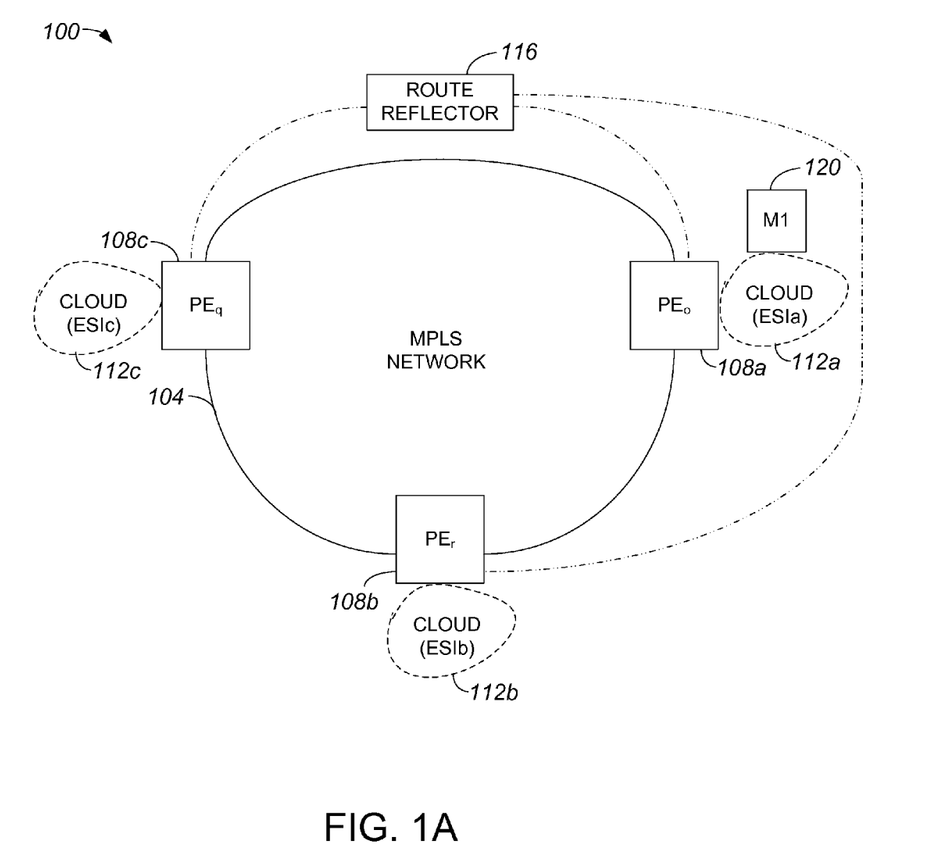
FIG. 1A is a diagrammatic representation of an overall system in which a media access control (MAC) address is learned by a first provider edge at a time t1 in accordance with an embodiment.

Referring initially to FIG. 1A, an overall system in which a MAC address is learned by a first provider edge at a time t1 will be described in accordance with an embodiment. An overall system 100, e.g., a general network system associated with an overall MPLS-enabled network, includes a plurality of PE nodes 108a-c that is a part of an MPLS network or core 104. MPLS network 104 runs E-VPN. Each PE 108a-c has an associated cloud 112a-c, and each cloud 112a-c is generally associated with at least one Ethernet segment or attachment circuit. Typically, PEs 108a-c are E-VPN MPLS edge switches, although PEs 108a-c are not limited to being E-VPN edge switches. Overall system 100 also includes at least one route reflector 116, e.g., a BGP route reflector that maintains a BGP relationship with each PE 108a-c included in overall system 100. PEs 108a-c may communicate via route reflector 116.

PEs 108a-c are configured to support the effective attachment of an element, as for example a server, substantially behind PEs 108a-c. In the embodiment as shown, $PE_o$ 108a is associated with cloud 112a which has an Ethernet segment or attachment circuit with an Ethernet Segment Identifier (ESI) of 'ESIa', $PE_r$ 108b is associated with cloud 112b which has an Ethernet segment or attachment circuit with an ESI of 'ESIb', and $PE_q$ 108c is associated with cloud 112c which has an Ethernet segment or attachment circuit with an ESI of 'ESIc'.

At a time t1, a virtual machine executing on a server 120 may effectively attach to a site, e.g., cloud 112a, behind $PE_o$ 108a. Attaching to a site may include, for example, establishing communications with the site such that the virtual machine executing on server 120 may communicate with MPLS network 104 through the site. As will be appreciated by those skilled in the art, to attach a virtual machine to a site, and operator may configure, e.g., via a management tool or application, a virtual machine on a physical server such as server 120. As a result, the virtual machine is instantiated on that server, e.g., is loaded to memory and starts executing, and begins sending address resolution protocol (ARP) broadcast traffic. The provider edge to which the virtual machine is attached generally receives the broadcast, and learns the source MAC address of the virtual machine.

As shown, the virtual machine executing on server 120 has a MAC address of M1. When the virtual machine executing on server 120 attaches to cloud 112a, the virtual machine executing on server 120 effectively attaches to Ethernet segment or attachment circuit ESIa. When $PE_o$ 108a detects the presence of the virtual machine executing on server 120 substantially behind $PE_o$ 108a, or otherwise in communication with MPLS network 104 through $PE_o$ 108a, $PE_o$ 108a may send, e.g., broadcast, a BGP MAC route advertisement for MAC address M1 with an ESI set to ESIa. The MAC route advertisement, upon being received by $PE_r$ 108b and $PE_q$ 108c, is processed by $PE_r$ 108b and $PE_q$ 108c to identify that the virtual machine executing on server 120 is substantially behind $PE_o$ 108a. Typically, $PE_r$ 108b and $PE_q$ 108c may each update its associated forwarding information base (FIB) to install a forwarding entry as identifying the virtual machine executing on server 120 and, hence MAC address M1, as being substantially behind $PE_o$ 108a.

Figure 1B:
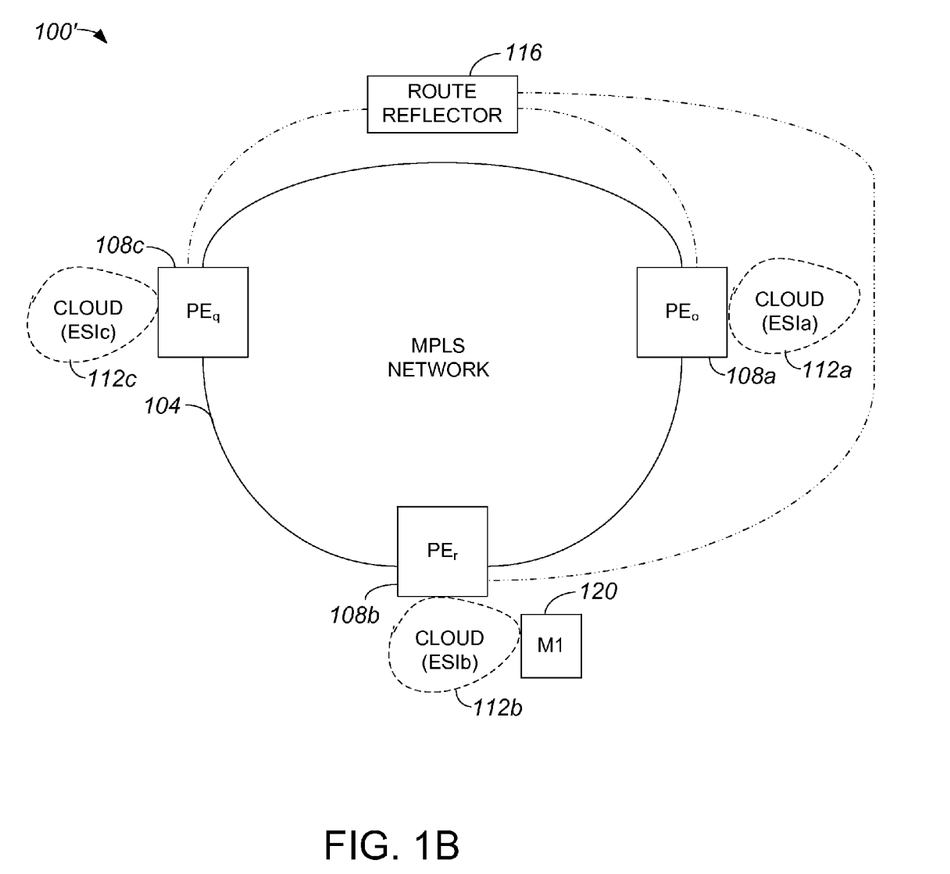
FIG. 1B is a diagrammatic representation of an overall system, e.g., overall system 100 of FIG. 1A, at a time t2 after a MAC address, e.g., MAC address M1 120 of FIG. 1A, has moved to a site connected to a second provider edge in accordance with an embodiment.

The virtual machine executing on server 120 may move from substantially behind $PE_o$ 108a to behind $PE_r$ 108b at a time t2. As will be appreciated by those skilled in the art, a virtual machine may move, for example, when an operator issues a command in a management tool or application that causes the virtual machine executing on server 120 to start effectively migrating from one physical server to another physical server. Time t2, in the described embodiment, occurs after time t1 and after $PE_r$ 108b and $PE_q$ 108c have effectively become aware that the virtual machine executing on server 120 is substantially behind $PE_o$ 108a. FIG. 1B is a diagrammatic representation of system 100 at a time t2 after the virtual machine executing on server 120, which has a MAC address of M1, has moved to a site connected to $PE_r$ 108b in accordance with an embodiment. When the virtual machine executing on server 120 moves behind from behind $PE_o$ 108a to behind $PE_r$ 108b, the virtual machine executing on server 120 attaches to cloud 112b and effectively to Ethernet segment or attachment circuit ESIb. Upon detecting that the virtual machine executing on server 120 is behind $PE_r$ 108b, $PE_r$ 108b may send, or otherwise provide, a BGP MAC route advertisement for MAC address M1 with an ESI set to ESIb. As will be discussed in more detail below with respect to FIGS. 3 and 4A-E, the BGP MAC route advertisement may include a MAC address mobility attribute, as for example an E-VPN MAC Mobility BGP Extended Community attribute, which indicates that the virtual machine executing on server 120, which has MAC address M1, has moved. The MAC route advertisement sent by $PE_r$ 108b, upon being received by $PE_o$ 108a and $PE_q$ 108c, is processed by $PE_o$ 108b and $PE_q$ 108c to identify that the virtual machine executing on server 120 is substantially behind $PE_r$ 108b. It should be appreciated that, in some instances, the MAC route advertisement sent by $PE_r$ 108b may not be obtained by $PE_o$ 108a and $PE_q$ 108c until after the virtual machine executing on server 120 has once again moved.

Figure 1C:
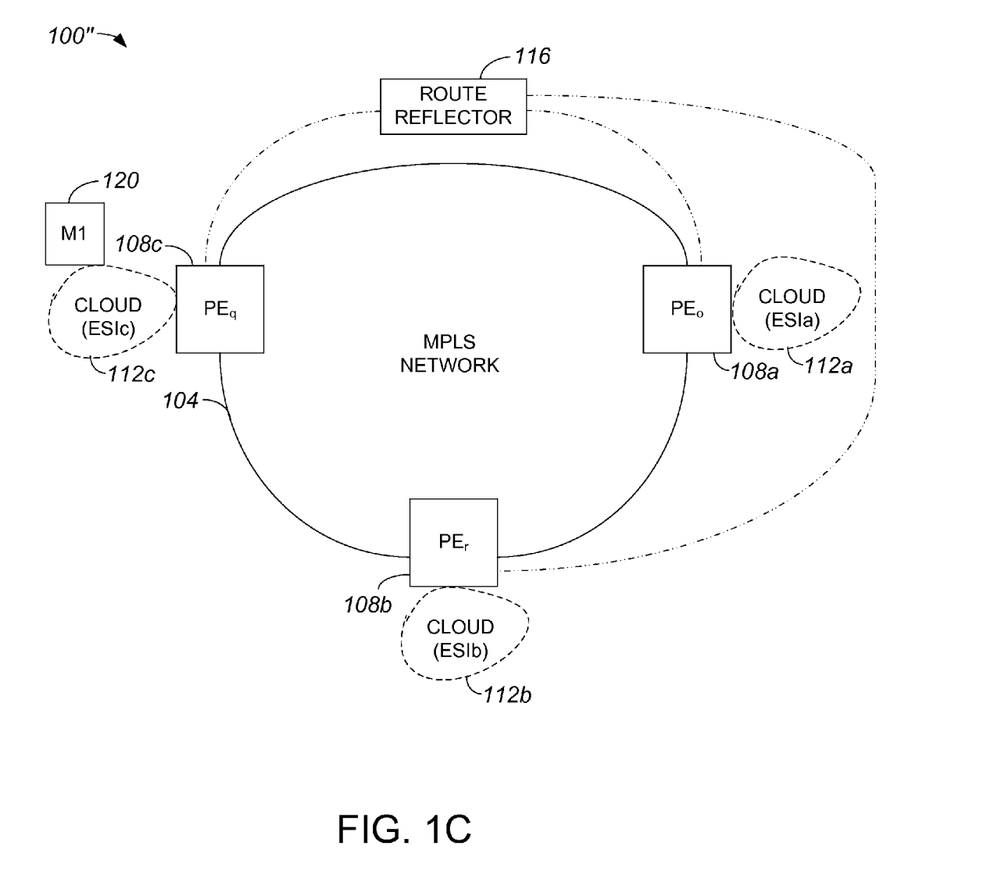
FIG. 1C is a diagrammatic representation of an overall system, e.g., overall system 100 of FIG. 1A, at a time t3 after a MAC address, e.g., MAC address M1 120 of FIG. 1A, has moved to a site connected to a third provider edge in accordance with an embodiment.

At a time t3, as shown in FIG. 1C, the virtual machine executing on server 120 moves from substantially behind $PE_r$ 108b to substantially behind $PE_q$ 108c. When the virtual machine executing on server 120 moves behind from behind $PE_r$ 108b to behind $PE_q$ 108c, the virtual machine executing on server 120 attaches to cloud 112c and effectively to Ethernet segment or attachment circuit ESIc. $PE_q$ 108c, may send, e.g., broadcast, a BGP MAC route advertisement for MAC address M1 with an ESI set to ESIc after determining that the virtual machine executing on server 120 is effectively attached behind cloud 112c. As will be discussed in more detail below with respect to FIGS. 4A-E, the BGP MAC route advertisement may include a MAC address mobility attribute which is configured to indicate that MAC address M1 has moved. The MAC route advertisement sent by $PE_q$ 108c, upon being received by $PE_o$ 108a and $PE_r$ 108b, is processed by $PE_o$ 108b and $PE_r$ 108b to identify that the virtual machine executing on server 120 is substantially behind $PE_q$ 108c. In some situations, when the virtual machine executing on server 120 moves in a relatively short period of time from behind $PE_r$ 108b to behind $PE_q$ 108c, the MAC route advertisement sent by $PE_q$ 108c may be sent before the MAC route advertisement sent by $PE_r$ 108b, as previously discussed with respect to FIG. 1B, is obtained by $PE_q$ 108c. The actual location of the virtual machine executing on server 120 and, hence, MAC address M1 may be determined through the use of the MAC address mobility attributes contained in the MAC route advertisements, as will be discussed below with respect to FIGS. 4A-E.

Figure 2:
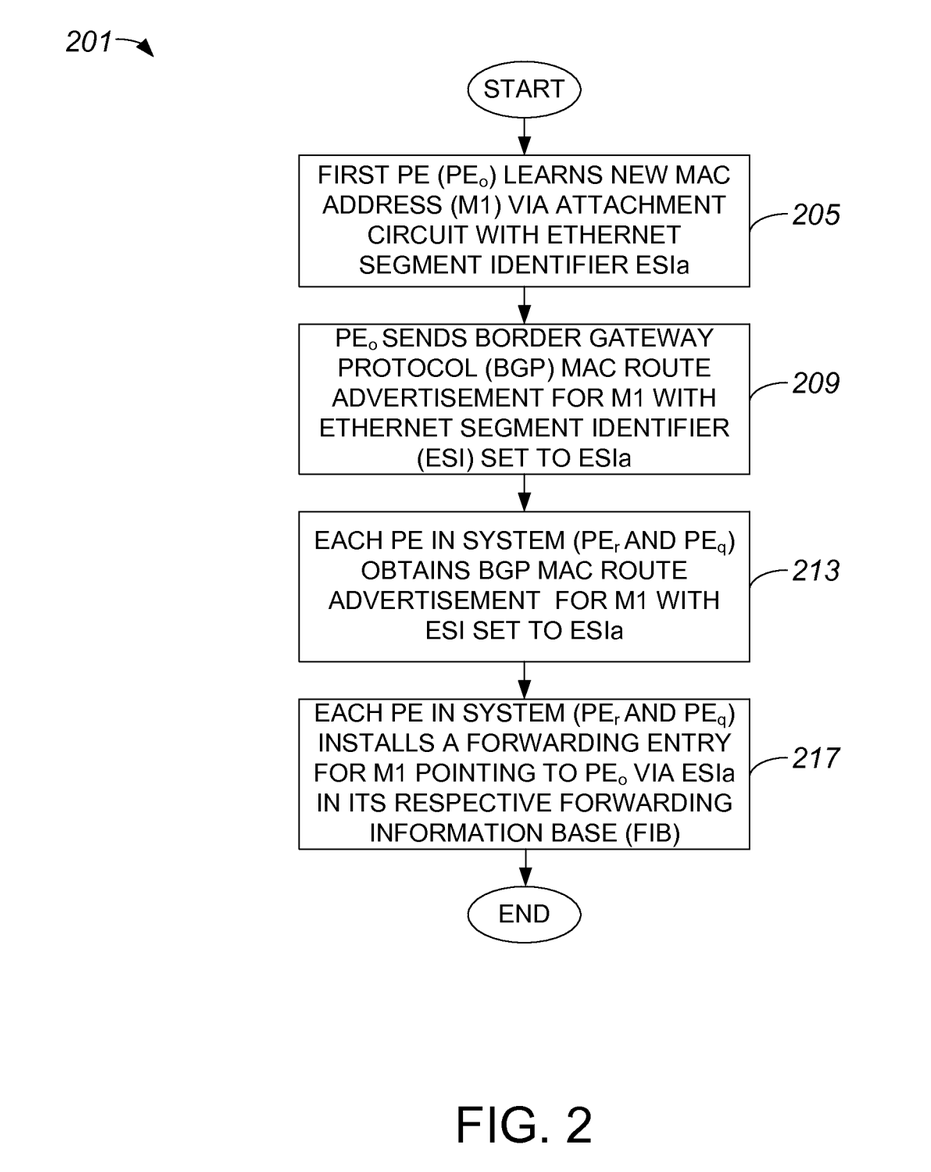
FIG. 2 is a process flow diagram which illustrates one method of a system processing a new MAC address in accordance with an embodiment.

When a new MAC address is effectively recognized or learned within an overall system such as overall system 100 of FIGS. 1A-C, information relating to the new MAC address may be sent to each PE associated with overall system 100. FIG. 2 is a process flow diagram which illustrates one method of a system processing a new MAC address, e.g., a MAC address associated with a new device on which a virtual machine may run, in accordance with an embodiment. A method 201 of processing a new MAC address identified in a system may begin at step 205 in which a first PE, e.g., $PE_o$ 108a of FIGS. 1A-C, learns of a new MAC address M1 via an Ethernet segment or attachment circuit with an ESI of ESIa. $PE_o$ may learn of the presence of the new MAC address M1 associated with a device when a virtual machine on the device sends traffic from the MAC address M1 over Ethernet segment ESIa to $PE_o$. In one embodiment, MAC address M1 may be identified as new if a FIB of $PE_o$ does not include an entry relating to MAC address M1.

Once $PE_o$ learns of new MAC address M1, $PE_o$ sends a BGP MAC route advertisement for M1 with an ESI set to ESIa in step 209. In general, the MAC route advertisement is sent to every PE in a system that is in the same Layer 2 VPN instance as $PE_o$. After $PE_o$ sends the BGP MAC route advertisement, every other PE in the system, e.g., $PE_r$ and $PE_q$ of system 100 of FIGS. 1A-C, obtains the BGP MAC route advertisement in step 213. In step 217, each PE in the system installs a forwarding entry for M1 that points to $PE_o$ via ESIa in its associated FIB. For example, $PE_r$ may install a forwarding entry for M1 that points to $PE_o$ via ESIa in its FIB and $PE_q$ may install a forwarding entry for M1 that points to $PE_o$ via ESIa in its FIB. The method of processing a new MAC address identified in a system is completed after the FIBs of each PE in a system are updated.

Figure 3:
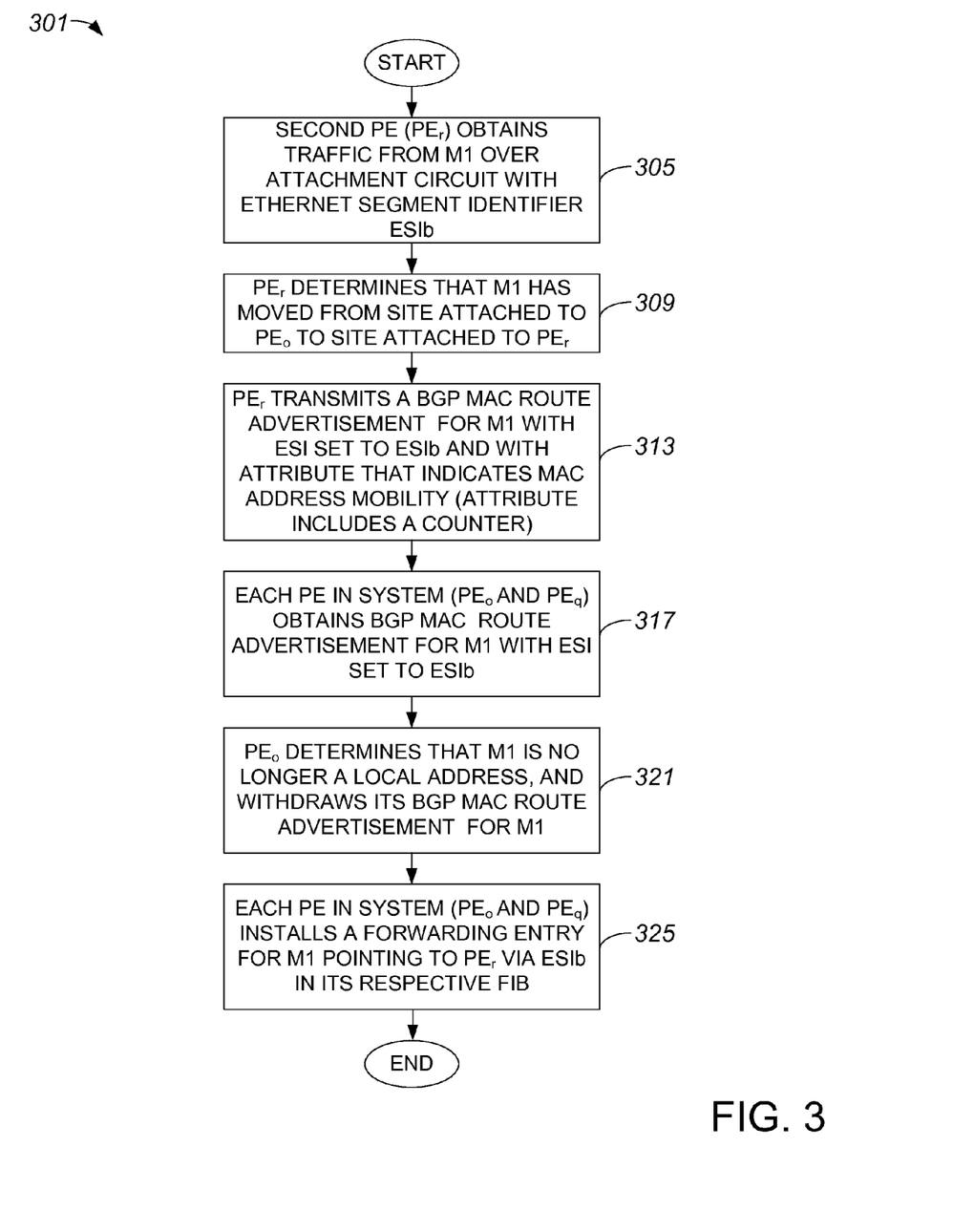
FIG. 3 is a process flow diagram which illustrates one method of a system processing a move of a MAC address from an attachment circuit associated with one provider edge to an attachment circuit associated with another provider edge in accordance with an embodiment.
Figure 4A:
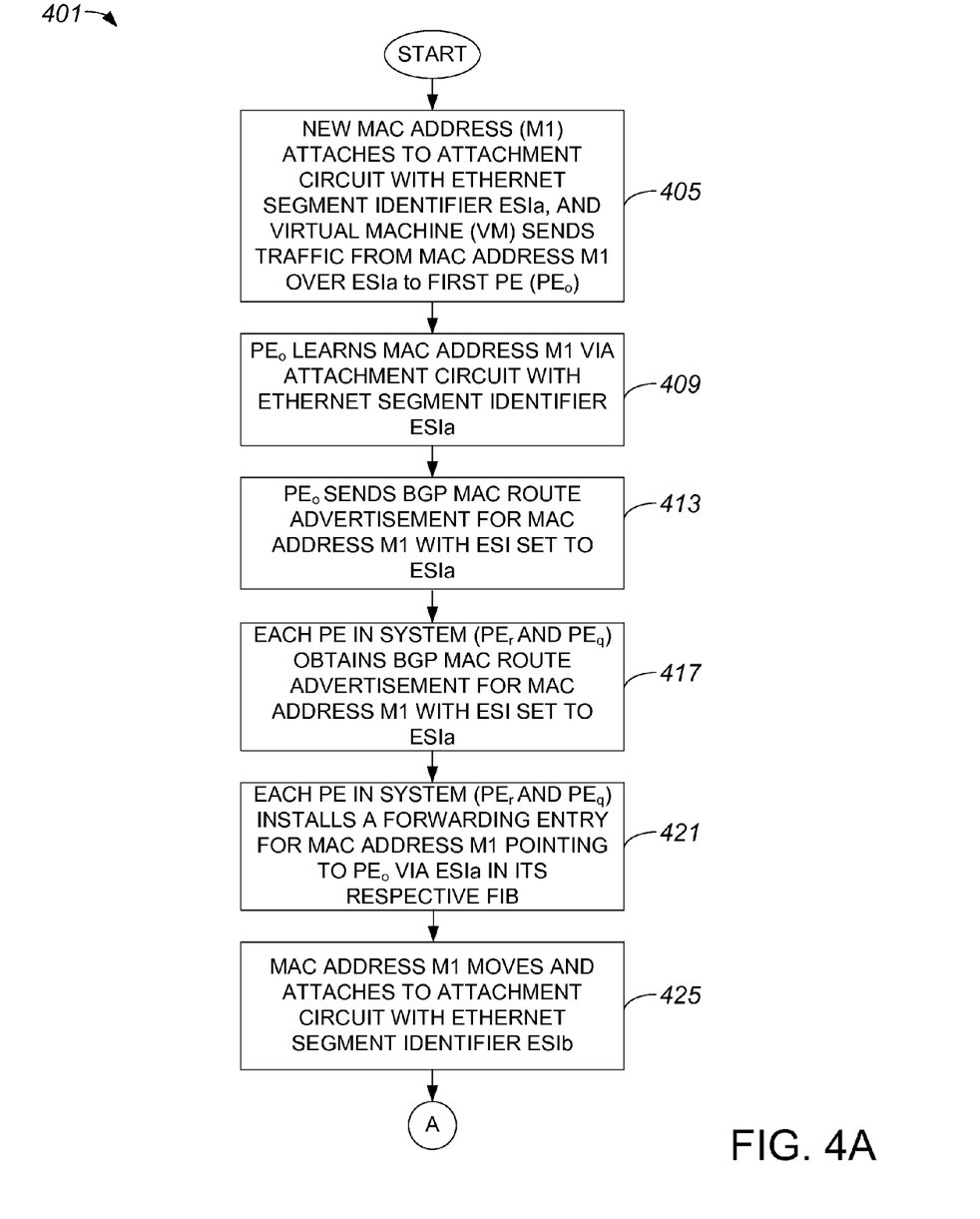
FIGS. 4A-E are a process flow diagram which illustrates one method of a system processing a first move of a MAC address from an attachment circuit associated first provider edge to an attachment circuit associated with a second provider edge, and a second move of the MAC address from the attachment circuit associated with the second provider edge to an attachment circuit associated with a third provider edge in accordance with an embodiment.
Figure 4B:
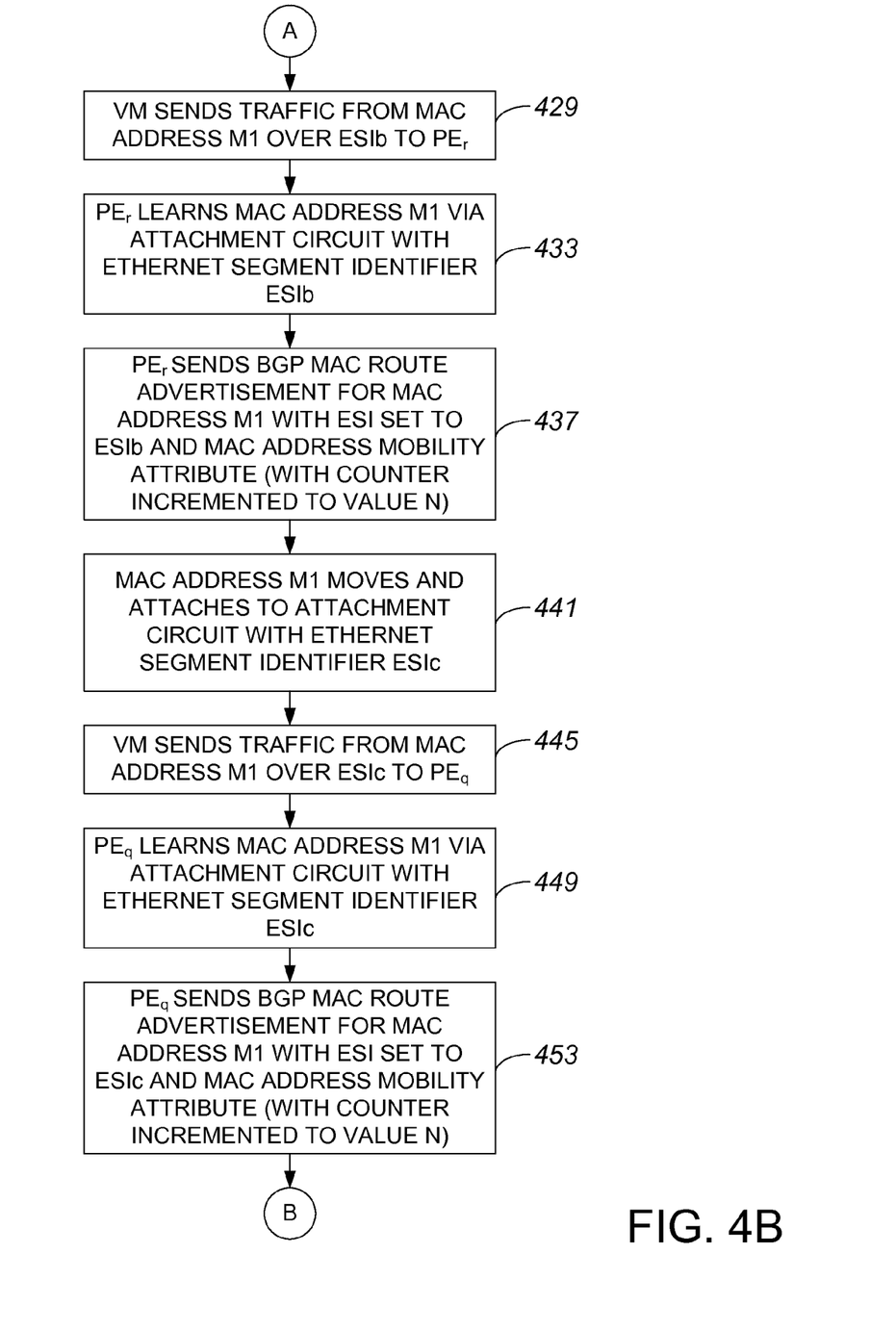
Figure 4C:
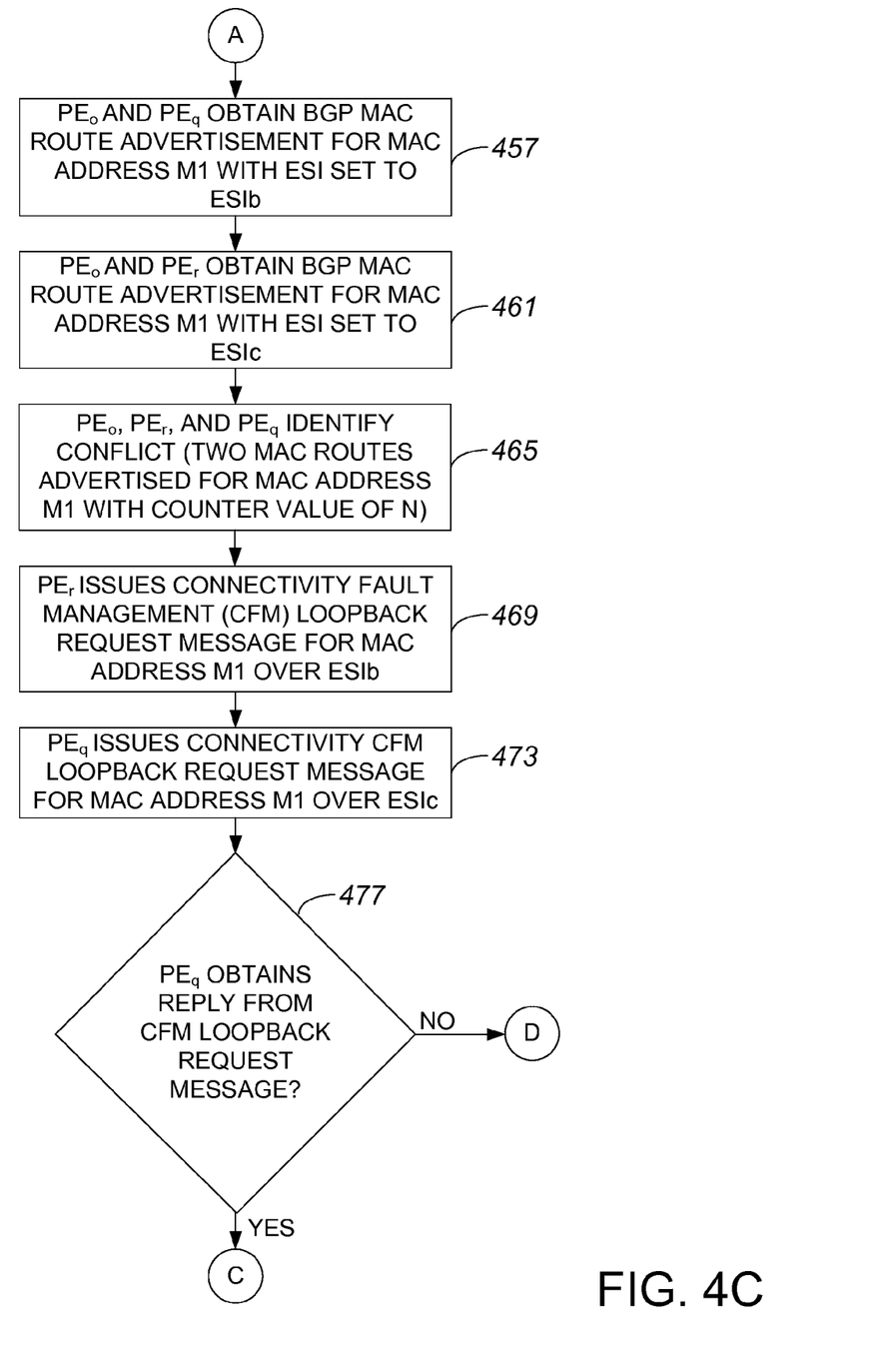
Figure 4D:
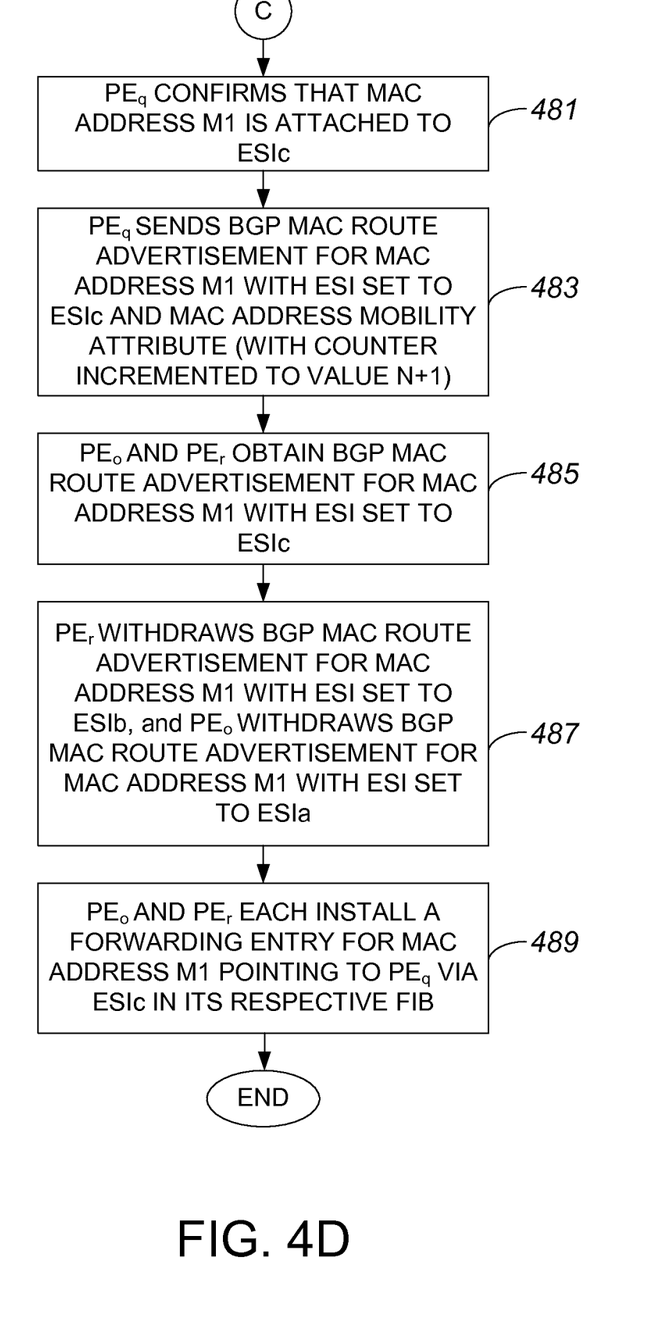
Figure 4E:
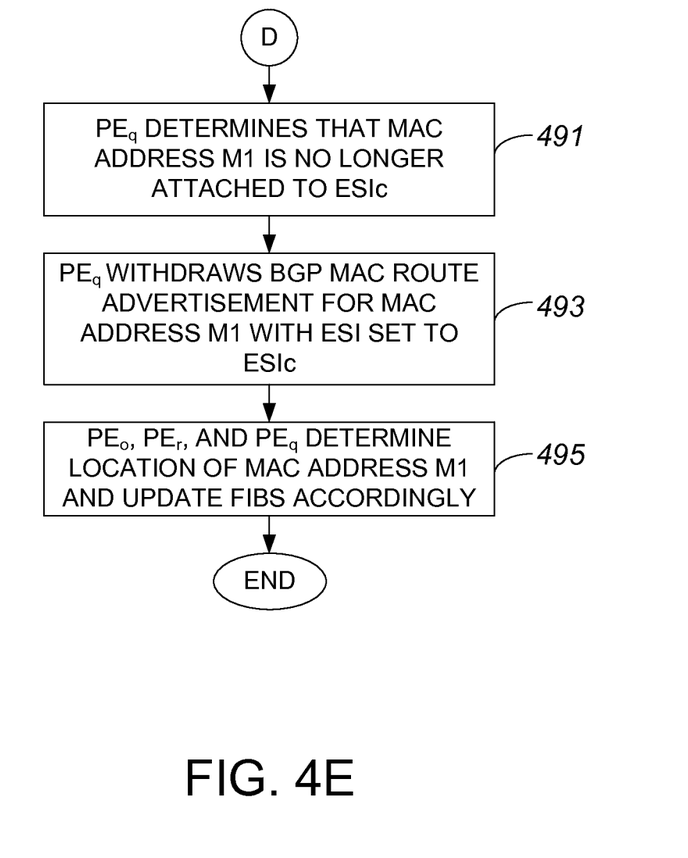

As described above, a component with a MAC address may move within a system that includes an E-VPN. When a component that has a MAC address known within a system moves from behind one PE to behind another PE, a PE within the system may identify that the MAC address has effectively moved and propagate information relating to the move through the system. The propagation of information may be to any number of components in the system. FIG. 3 is a process flow diagram which illustrates one method of a system processing a move of a MAC address from an attachment circuit associated with one PE to an attachment circuit associated with another PE in accordance with an embodiment. A method 301 of processing a move of a MAC address from behind one PE to behind another PE begins at step 305 in which a second PE, e.g., $PE_r$ 108a of FIGS. 1A-C, obtains traffic from MAC address M1 via an Ethernet segment or attachment circuit with an ESI of ESIb.

In step 309, $PE_r$ determines that MAC address M1 has moved from behind another PE in the system. For example, in the described embodiment, $PE_r$ determines that MAC address M1 has moved from a site attached to $PE_o$ to a site attached to $PE_r$ because the FIB associated with $PE_r$ contains a forwarding entry for MAC address M1 that essentially points to $PE_o$. After determining that MAC address M1 has moved from behind another PE, process flow moves to step 313 in which $PE_r$ transmits a BGP MAC route advertisement for M1 with an ESI set to ESIb, which is the ESI associated with $PE_r$, and with an attribute that indicates MAC address mobility. The attribute may be, in one embodiment, an E-VPN MAC Mobility BGP Extended Community attribute. The attribute includes a flag or a counter. Such a counter may be set to an initial value, as for example an initial value of '1', in the BGP MAC route advertisement for M1 with ESI set to ESIb. The initial value of the counter is arranged to indicate that the move of MAC address M1 from $PE_o$ to $PE_r$ is a first move of MAC address M1 within the system.

After $PE_r$ transmits the BGP MAC route advertisement for M1 with the ESI set to ESIb, in step 317, every other PE in the system, e.g., $PE_o$ and $PE_q$ of system 100 of FIGS. 1A-C, obtains the BGP MAC route advertisement for MAC address M1 with the ESI set to ESIb. Upon obtaining the BGP route advertisement for MAC address M1 with the ESI set to ESIb, $PE_o$ determines that MAC address M1 is no longer a local address, i.e., that MAC address M1 is no longer behind $PE_o$, in step 321, and withdraws its BGP MAC route advertisement for MAC address M1 with the ESI set to ESIa.

In step 325, each PE in the system installs a forwarding entry for M1 that points to $PE_r$ via ESIb in its associated FIB. For example, $PE_o$ may install a forwarding entry for M1 that points to $PE_r$ via ESIb in its FIB and $PE_q$ may install a forwarding entry for M1 that points to $PE_r$ via ESIb in its FIB. The method of processing a move of a MAC address from behind one PE to behind another PE may be completed after the FIBs of each PE in a system are updated.

Some mobile devices may move from behind a first PE to behind a second PE, and subsequently to behind a third PE. In some instances, the move of a mobile device from behind a second PE to behind a third PE may occur before an overall system that includes the PEs is effectively made aware that the mobile device was behind the second PE. With reference to FIGS. 4A-E, a method of processing multiple moves of a mobile device will be described in accordance with an embodiment. FIGS. 4A-E are a process flow diagram which illustrates one method of a system processing a first move of a MAC address from an attachment circuit associated first provider edge to an attachment circuit associated with a second provider edge, and a second move of the MAC address from the attachment circuit associated with the second provider edge to an attachment circuit associated with a third provider edge in accordance with an embodiment. A method of processing movement by a device which has a MAC address between PEs may begin at step 405 in which a new MAC address M1, e.g., a MAC address associated with a virtual machine, attaches to an attachment circuit or Ethernet segment ESIa, and the virtual machine associated with MAC address M1 sends traffic from MAC address M1 over attachment circuit or Ethernet segment ESIa to a first PE, e.g., $PE_o$ of FIGS. 1A-C.

In step 409, $PE_o$ learns of MAC address M1 via attachment circuit or Ethernet segment ESIa. Then, in step 413, $PE_o$ sends a BGP MAC route advertisement for MAC address M1, with an ESI set to ESIa. As will be appreciated by those skilled in the art, the BGP MAC route advertisement is sent throughout the overall system, as for example to substantially all PEs within the overall system.

Every other PE in the system, e.g., $PE_r$ and $PE_q$ of FIGS. 1A-C, obtains the BGP MAC route advertisement for MAC address M1 with the ESI set to ESIa in step 417. After obtaining the BGP MAC route advertisement for MAC address M1 with the ESI set to ESIa, each PE installs a forwarding entry in step 421 for MAC address M1 that points to via ESIa in its respective FIB.

In step 425, MAC address M1 moves, or the virtual machine associated with MAC address M1 moves, and attaches to an attachment circuit or Ethernet segment with an ESI of ESIb. By way of example, with respect to FIGS. 1A-C, MAC address M1 may move and attach to attachment circuit or Ethernet segment ESIb, which is effectively behind $PE_r$. Upon attaching to attachment circuit or Ethernet segment ESIb, the virtual machine associated with MAC address M1 sends traffic over ESIb to $PE_r$ in step 429.

$PE_r$ learns MAC address M1 in step 433 via the attachment circuit or Ethernet segment with an ESI of ESIb. Once $PE_r$ learns MAC address M1 via the attachment circuit or Ethernet segment with the ESI of ESIb, $PE_r$ sends a BGP MAC route advertisement for MAC address M1 with an ESI set to ESIb, as well as a MAC address mobility attribute in step 437. In one embodiment, the MAC address mobility attribute includes a counter that has been incremented or otherwise set to a value of 'N'. The MAC address mobility attribute is configured to indicate that MAC address M1 is mobile, and the counter is arranged to be incremented each time MAC address M1 has moved. For example, as MAC address M1 has moved from being behind $PE_o$ to being behind $PE_r$, MAC address M1 has moved once and 'N' may equal one. It should be appreciated that $PE_r$ is able to determine that MAC address M1 has moved because MAC address M1 appears in the FIB associated with $PE_r$.

In the described embodiment, before the BGP MAC route advertisement sent by $PE_r$ is obtained by other PEs in the overall system, MAC address M1 moves in step 441 and attaches to an attachment circuit or Ethernet segment with an ESI of ESIc. By way of example, with respect to FIGS. 1A-C, MAC address M1 may move and attach to attachment circuit or Ethernet segment ESIc, which is effectively behind $PE_q$. Once MAC address M1 is attached to attachment circuit or Ethernet segment ESIc, the virtual machine associated with MAC address M1 sends traffic over ESIc to $PE_q$ in step 445.

$PE_q$ learns MAC address M1 in step 449 via the attachment circuit or Ethernet segment with an ESI of ESIc. After $PE_q$ learns MAC address M1 via the attachment circuit or Ethernet segment with the ESI of ESIc, $PE_q$ sends a BGP MAC route advertisement for MAC address M1 with an ESI set to ESIc, as well as a MAC address mobility attribute with a counter in step 453. Because $PE_q$ is unaware MAC address M1 has moved from behind $PE_r$ to behind $PE_q$, and effectively believes that MAC address M1 has moved substantially directly from behind $PE_o$ to behind $PE_q$, the counter in the MAC address mobility attribute sent by $PE_q$ is set to a value of 'N'. The value of 'N' set in the BGP MAC route advertisement for MAC address M1 with the ESI set to ESIc is the same as the value of 'N' set in the BGP MAC route advertisement for MAC address M1 with the ESI set to ESIb because $PE_q$ has not yet obtained the BGP MAC route advertisement for MAC address M1 with the ESI set to ESIb, and is not aware that MAC address M1 was previously located behind $PE_r$.

In step 457, $PE_o$ and $PE_q$ obtain the BGP MAC route advertisement for MAC address M1 with the ESI set to ESIb, i.e., the BGP MAC route advertisement sent by $PE_r$. Then, in step 461, $PE_o$ and $PE_r$ obtain the BGP MAC route advertisement for MAC address M1 with the ESI set to ESIc, i.e., the BGP MAC route advertisement sent by $PE_q$. Then, in step 465, $PE_o$, $PE_o$, and $PE_o$ identify a conflict, as two MAC routes have been advertised for MAC address M1 with a counter value of 'N'.

To resolve the conflict identified in step 465, $PE_r$ issues a connectivity fault management (CFM) loopback request message for MAC address M1 over ESIb in step 469, and $PE_q$ issues a CFM loopback request message for MAC address M1 over ESIc in step 473. The issuance of CFM loopback messages facilitates a determination of the actual location of MAC address M1. It should be appreciated that, in some instances, a predetermined number of CFM loopback request messages may be sent by $PE_r$ and $PE_q$. From step 473, process flow moves to step 477 in which a determination is made as to whether $PE_q$ obtains a reply based on the CFM loopback request message issued by $PE_q$. In one embodiment, $PE_q$ may wait a predetermined amount of time for a reply based on the CFM loopback request message. If the determination in step 477 is that $PE_q$ has obtained a reply from the CFM loopback request message it issued, then in step 481, $PE_q$ confirms that MAC address M1 is attached to ESIc. Upon confirming that MAC address M1 is attached to ESIc, $PE_q$ sends a new BGP MAC route advertisement for MAC address M1 with an ESI set to ESIc, as well as a MAC address mobility attribute that includes a counter incremented to a value of 'N+1' in step 483. In the described embodiment, the value of 'N+1' may be equal to a value of two to indicate that MAC address M1 has essentially moved twice. It should be appreciated that $PE_q$ may typically store the value of 'N+1' locally to effectively record that MAC address M1 has moved a number of times equal to 'N+1'.

$PE_o$ and $PE_r$ obtain the BGP MAC route advertisement for MAC address MI with the ESI set to ESIc, as well as the MAC address mobility attribute that includes a counter incremented to the value of 'N+1' in step 485. Upon obtaining the BGP MAC route advertisement for MAC address M1 with the ESI set to ESIc, as well as the MAC address mobility attribute that includes a counter incremented to the value of 'N+1', $PE_r$ withdraws its BGP MAC route advertisement for MAC address M1 with the ESI set to ESIb, and $PE_o$ withdraws its BGP MAC route advertisement for MAC address M1 with the ESI set to ESIa, in step 487. $PE_o$ and $PE_r$ each install a forwarding entry for MAC address M1 pointing to $PE_q$ via ESIc in its respective FIB in step 489, and may each store the value of the counter, e.g., the value of 'N+1', locally. After the FIBs of $PE_o$ and $PE_r$ are updated, the method of processing movement by a device which has a MAC address between different PEs in an overall system may be completed.

Returning to step 477, if it is determined that $PE_q$ has not obtained a reply from the CFM loopback request message it issued, the implication is that MAC address M1 has moved once again and is no longer attached behind $PE_q$. Accordingly, in step 491, $PE_q$ determines that MAC address M1 is no longer attached to ESIc. It should be appreciated that MAC address M1 may have moved to another PE within an overall system, and may now be attached, for example, behind either $PE_o$ or $PE_r$.

In step 493, $PE_q$ withdraws the BGP MAC route advertisement for MAC address M1 with the ESI set to ESIc. Then, in step 495, $PE_o$, $PE_r$, and $PE_q$ determine the location of MAC address M1 and update associated FIBs accordingly. Determining the location of MAC address M1 may include, but is not limited to including, each PE determining whether it has obtained traffic from MAC address M1 over its associated attachment circuit or Ethernet segment and/or determining whether it has obtained a BGP MAC route advertisement. The method of processing movement by a device which has a MAC address between different PEs in an overall system may be completed once the location of MAC address M1 is determined and FIBs are updated as appropriate.

Figure 5:
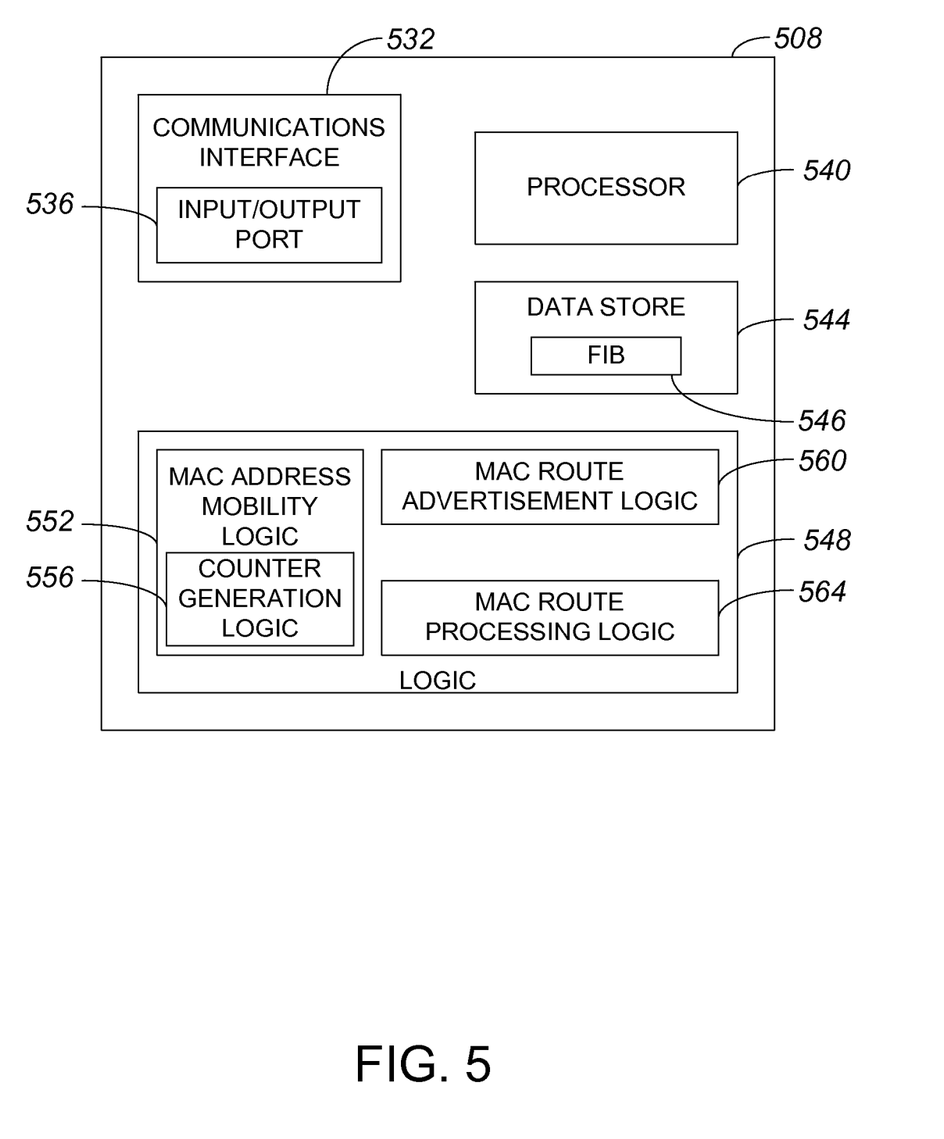
FIG. 5 is a block diagram representation of a provider edge in accordance with an embodiment.

A PE may generally be a router and/or a switch, although it should be appreciated that a PE is not limited to being a router and/or a switch. FIG. 5 is a block diagram representation of a PE in accordance with an embodiment. A PE 508 includes a communications interface 532 that allows PE 508 to communicate within a system or a network, e.g., with a mobile device attached behind PE 508 as well as within an MPLS network. Communications interface 532 includes at least one input/output port 536.

A processor 540 included in PE 508 is configured to execute logic or computer program codes, as for example logic configured to perform at least some portions of the methods of FIGS. 2, 3 and 4A-E. PE 508 also includes a data store 544 that stores data or information used by PE 508. A FIB 546 may be embodied in data store 544. Further, data store 544 may store a local copy of a counter (not shown) included in a MAC mobility attribute that is configured to indicate how many times a particular MAC address has moved within an overall system.

PE 508 also includes logic 548, which may include hardware and/or software logic. Logic 548 includes MAC address mobility logic 552, MAC route advertisement logic 560, and MAC route processing logic 564. MAC address mobility logic 552 is configured to generate and to process a MAC address mobility attribute for inclusion in a MAC route advertisement, and includes counter generation logic 556. Counter generation logic 556 is arranged to increment a counter that is a part of MAC address mobility attribute, and indicates a number of times a particular MAC address has moved within an overall system. MAC route advertisement logic 560 is configured to generate a BGP MAC route advertisement to provide to an overall system when a MAC address is identified as being attached to an attachment circuit or Ethernet segment (not shown) associated with PE 508. MAC route processing logic 564 is configured to determine when a MAC route advertisement has been obtained by PE 508 on communications interface 532, and to process the MAC route advertisement as appropriate. MAC route processing logic 564 typically also updates FIB 546 to indicate how a particular MAC address may be reached.

Although only a few embodiments have been described in this disclosure, it should be understood that the disclosure may be embodied in many other specific forms without departing from the spirit or the scope of the present disclosure. By way of example, although BGP has been described as being a suitable routing protocol that supports the advertising and exchange of MAC addresses, a routing protocol that supports the advertising and exchange of MAC addresses is not limited to being BGP. That is, any suitable routing protocol may be implemented with respect to the present disclosure.

A network has generally been described as being an MPLS network, e.g., an MPLS network that runs E-VPN. A network, however, is not limited to being an MPLS network but may, instead, be any suitable network. Suitable networks include, but are not limited to including, an Internet Protocol (IP) network or any other suitable layer 2 transport networks.

Each PE in an overall system or network may, upon obtaining a BGP MAC route advertisement that identifies a particular MAC address, effectively process the MAC address mobility attribute contained in the BGP MAC route advertisement to identify how many times the particular MAC address has moved. As previously mentioned, a counter that is a part of the MAC address mobility attribute may indicate how many times a particular MAC address has moved. Each PE may generally store information locally that identifies how many times a particular MAC address has moved. As such, when a PE prepares a MAC route advertisement for a particular MAC address, the PE may readily obtain information that indicates how many times the particular MAC address has already moved, and provide a counter in the MAC route advertisement that indicates how many times the PE perceives that the particular MAC address has moved.

The embodiments may be implemented as hardware and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. By way of example, FIGS. 4A-E may generally include steps associated with determining whether $PE_q$ obtains a reply associated with a CFM loopback request message. Therefore, the present examples are to be considered as illustrative and not restrictive, and the examples is not to be limited to the details given herein, but may be modified within the scope of the appended claims.

What is claimed is:

1. A method comprising:
obtaining an indication that a device is attached, the device having a media access control (MAC) address, wherein the device was previously attached to a first provider edge (PE) of a Multiprotocol Label Switching (MPLS) network; and
issuing a first advertisement that identifies the MAC address, the first advertisement including a first MAC address mobility attribute, the first MAC address mobility attribute being arranged to indicate a number of times the MAC address has moved with respect to the MPLS network.

2. The method of claim 1 further including:
determining when a second advertisement that identifies the MAC address is obtained;
when it is determined that the second advertisement that identifies the MAC address is obtained, determining when the second advertisement includes a second MAC address mobility attribute arranged to indicate the number of times the MAC address has moved with respect to the MPLS network; and
when it is determined that the second advertisement includes the second MAC address mobility attribute arranged to indicate the number of times the MAC address has moved with respect to the MPLS network, sending a request message to solicit a reply from the MAC address.

3. The method of claim 2 further including:
determining when a response message is obtained in response to the request message; and
when it is determined that the response message is obtained in response to the request message, identifying the device as being attached.

4. The method of claim 3 further including:
sending a third advertisement that identifies the MAC address, the third advertisement including a third MAC address mobility attribute, the third MAC address mobility attribute being arranged to indicate that the MAC address has moved with respect to the MPLS network one more than the number of times.

5. The method of claim 3 wherein when it is determined that the response message is not obtained in response to the request message, the method further includes:
withdrawing the first advertisement.

6. The method of claim 1 wherein obtaining the indication that the device is attached includes obtaining, at a second PE having a first attachment circuit, the indication that the device is attached, wherein the indication is traffic from the MAC address that is sent from the MAC address over the first attachment circuit.

7. The method of claim 1 wherein the first advertisement is a Border Gateway Protocol (BGP) MAC route advertisement.

8. The method of claim 1 wherein the MPLS network is an Ethernet virtual private network (E-VPN).

9. An apparatus comprising:
means for obtaining an indication that a device is attached, the device having a media access control (MAC) address, wherein the device was previously attached to a first provider edge (PE) of a Multiprotocol Label Switching (MPLS) network; and
means for issuing a first advertisement that identifies the MAC address, the first advertisement including a first MAC address mobility attribute, the first MAC address mobility attribute being arranged to indicate a number of times the MAC address has moved with respect to the MPLS network.

10. A tangible, non-transitory computer-readable medium comprising computer program code, the computer program code, when executed, configured to:
obtain an indication that a device is attached, the device having a media access control (MAC) address, wherein the device was previously attached to a first provider edge (PE) of a Multiprotocol Label Switching (MPLS) network; and
issue a first advertisement that identifies the MAC address, the first advertisement including a first MAC address mobility attribute, the first MAC address mobility attribute being arranged to indicate a number of times the MAC address has moved with respect to the MPLS network.

11. The tangible, non-transitory computer-readable medium of claim 10 wherein the computer program code is further configured to:
determine when a second advertisement that identifies the MAC address is obtained;
when it is determined that the second advertisement that identifies the MAC address is obtained, determine when the second advertisement includes a second MAC address mobility attribute arranged to indicate the number of times the MAC address has moved with respect to the MPLS network; and
when it is determined that the second advertisement includes the second MAC address mobility attribute arranged to indicate the number of times the MAC address has moved with respect to the MPLS network, send a request message to solicit a reply from the MAC address.

12. The tangible, non-transitory computer-readable medium of claim 11 wherein the computer program code is further configured to:
determine when a response message is obtained in response to the request message; and
when it is determined that the response message is obtained in response to the request message, identify the device as being attached.

13. The tangible, non-transitory computer-readable medium of claim 12 wherein the computer program code is further configured to:
send a third advertisement that identifies the MAC address, the third advertisement including a third MAC address mobility attribute, the third MAC address mobility attribute being arranged to indicate that the MAC address has moved with respect to the MPLS network one more than the number of times.

14. The tangible, non-transitory computer-readable medium of claim 12 wherein when it is determined that the response message is not obtained in response to the request message, the computer program code is further configured to:
withdraw the first advertisement.

15. The tangible, non-transitory computer-readable medium of claim 10 wherein the computer program code configured to obtain the indication that the device is attached is further configured to obtain, at a second PE having a first attachment circuit, the indication that the device is attached, wherein the indication is traffic from the MAC address that is sent from the MAC address over the first attachment circuit.

16. The tangible, non-transitory computer-readable medium of claim 10 wherein the first advertisement is a Border Gateway Protocol (BGP) MAC route advertisement.

17. The tangible, non-transitory computer-readable medium of claim 10 wherein the MPLS network is an Ethernet virtual private network (E-VPN).

18. An apparatus comprising:
a communications interface, the communications interface being arranged to allow the apparatus to communicate on a Multiprotocol Label Switching (MPLS) network and to allow the apparatus to communicate through an attachment circuit;
a processor; and
logic, the logic being configured to be executed by the processor, the logic being arranged to determine when an indication that a device having a MAC address is in communication with the attachment circuit is obtained, wherein the device was previously attached to a first provider edge (PE) of the MPLS network, the logic further being arranged to issue a first advertisement that identifies the MAC address when it is determined that the indication that the device is in communication with the attachment circuit is obtained, the first advertisement including a first MAC address mobility attribute that indicates a number of times the MAC address has moved with respect to the MPLS network.

19. The apparatus of claim 18 further including:
a forwarding information base (FIB), the FIB being arranged to store information that identifies the first PE as being associated with the device.

20. The apparatus of claim 18 wherein the logic is further operable to determine when a second advertisement that identifies the MAC address is obtained and, when it is determined that the second advertisement is obtained on the communications interface, the logic is still further operable to process the second advertisement to determine when the second advertisement includes a second MAC address mobility attribute that indicates the number of times the MAC address has moved with respect to the MPLS network.

21. The apparatus of claim 20 wherein when it is determined that the second advertisement includes the second MAC address mobility attribute that indicates the number of times the MAC address has moved with respect to the MPLS network, the logic is further operable to send a request message to solicit a reply from the MAC address.

22. The apparatus of claim 21 wherein the logic is further operable to determine when a response message is obtained in response to the request message, and when it is determined that the response message is obtained in response to the request message, the logic is still further operable to identify the device as being attached to the attachment circuit.

23. The apparatus of claim 18 wherein MPLS network includes an Ethernet virtual private network (E-VPN), and wherein the apparatus is a second PE of the E-VPN.

* * * * *